US005852856A

United States Patent [19]

Seidel

[11] Patent Number: 5,852,856

[45] Date of Patent: Dec. 29, 1998

[54] ANTI THEFT INK TAG

[76] Inventor: Stuart T. Seidel, 6531 Park of Commerce Blvd., Building 150, Boca Raton, Fla. 33487

[21] Appl. No.: 969,991

[22] Filed: Nov. 13, 1997

[51] Int. Cl.[6] .............................. A44B 9/00; E05B 65/00; F16B 21/00

[52] U.S. Cl. .......................... 24/704.1; 24/704.2; 70/57.1

[58] Field of Search ............................... 24/704.1, 704.2, 24/456; 70/57.1

[56] References Cited

U.S. PATENT DOCUMENTS

| | | | |
|---|---|---|---|
| Re. 35,361 | 10/1996 | Hogan et al. . | |
| 3,944,976 | 3/1976 | France . | |
| 4,021,705 | 5/1977 | Lichtblau . | |
| 4,498,076 | 2/1985 | Lichtblau . | |
| 4,567,473 | 1/1986 | Lichtblau . | |
| 4,673,923 | 6/1987 | Boscoe et al. . | |
| 4,692,746 | 9/1987 | Budin et al. . | |
| 4,692,747 | 9/1987 | Wolf . | |
| 4,717,438 | 1/1988 | Benge et al. . | |
| 4,720,701 | 1/1988 | Lichtblau . | |
| 4,728,938 | 3/1988 | Kaltner . | |
| 4,778,552 | 10/1988 | Benge et al. . | |
| 4,802,944 | 2/1989 | Benge . | |
| 4,818,312 | 4/1989 | Benge . | |
| 4,831,363 | 5/1989 | Wolf . | |
| 4,843,404 | 6/1989 | Benge et al. . | |
| 4,846,922 | 7/1989 | Benge et al. . | |
| 4,910,499 | 3/1990 | Benge et al. . | |
| 4,944,075 | 7/1990 | Hogan . | |
| 4,954,814 | 9/1990 | Benge . | |
| 4,968,972 | 11/1990 | Canipe . | |
| 5,006,856 | 4/1991 | Benge et al. . | |
| 5,012,225 | 4/1991 | Gill . | |
| 5,022,244 | 6/1991 | Charlot, Jr. . | |
| 5,031,287 | 7/1991 | Charlot, Jr. et al. . | |
| 5,054,172 | 10/1991 | Hogan et al. . | |
| 5,069,047 | 12/1991 | Lynch et al. . | |
| 5,081,445 | 1/1992 | Gill et al. . | |
| 5,088,165 | 2/1992 | Minasy et al. | 24/704.1 |
| 5,140,836 | 8/1992 | Hogan et al. . | |
| 5,142,292 | 8/1992 | Chang . | |
| 5,182,544 | 1/1993 | Aquilera et al. . | |
| 5,275,122 | 1/1994 | Stolz et al. . | |
| 5,276,431 | 1/1994 | Piccoli et al. . | |
| 5,347,262 | 9/1994 | Thurmond et al. . | |
| 5,367,289 | 11/1994 | Baro et al. . | |
| 5,372,020 | 12/1994 | Stoltz et al. . | |
| 5,392,028 | 2/1995 | Pichl . | |
| 5,392,620 | 2/1995 | Stoltz et al. . | |
| 5,428,875 | 7/1995 | Nguyen et al. . | |
| 5,438,738 | 8/1995 | Stolz et al. . | |
| 5,510,770 | 4/1996 | Rhoads . | |
| 5,574,431 | 11/1996 | Mckeown et al. . | |
| 5,745,965 | 5/1998 | Stoltz et al. | 24/704.1 |

FOREIGN PATENT DOCUMENTS

| | | |
|---|---|---|
| 0 463 233 A3 | 12/1990 | European Pat. Off. . |
| 0 472 073 A3 | 8/1991 | European Pat. Off. . |
| 0 473 970 A3 | 8/1991 | European Pat. Off. . |

*Primary Examiner*—Victor N. Sakran
*Attorney, Agent, or Firm*—Lott & Friedland, P.A.

[57] ABSTRACT

An anti theft ink tag designed to permanently render an article useless if unauthorized removal of the tag is attempted. The anti theft ink tag includes ampules containing a permanent staining substance. The ampules are supported in a base component with holes that allow the staining substance to escape if the ampules are fractured. A cover component with a break away element covers the base component. Permanently attached to the break away element is an elongated pin type connecting unit that is used to attach the tag to the article being protected, and locked into place by a locking mechanism. When an unauthorized removal of the tag is attempted, the break away element fractures the ampules and also exposes the outside of the cover component to the staining substance.

8 Claims, 2 Drawing Sheets

ANTI THEFT INK TAG

TECHNICAL FIELD

This invention relates generally to theft deterrent devices, and this invention specifically relates to an anti theft ink tag used to deter the theft of articles by permanently staining the article if theft is attempted thereby rendering the article useless.

BACKGROUND OF THE INVENTION

In the retail security industry, theft deterrent devices that are attached to the article to be protected have become an important tool to combat retail theft. Theft deterrent devices of this nature are intended to be attached to articles that are easily removed from stores. The devices are attached in such a manner that they are readily visible to the potential thief and that an unauthorized attempt to remove the device will cause the article to be permanently stained by ink. The theory of deterrence being that the potential thief, recognizing that the article will be useless due to the staining, will have no incentive to steal articles protected by these devices.

Emphasis should be placed on the functional reliability of these devices for a number of reasons. Most obviously, in order to deter, the potential thief must believe that the device will function as intended if any unauthorized removal is attempted. Also, due to the fact that the device will render the article useless, it is necessary that the device not discharge the ink unless unauthorized removal is attempted. Simplicity of design is desired in order to enhance functional reliability. The less complicated the device, the more likely it will function as desired.

Other factors to be considered in the design of these devices are the cost to manufacture, the weight of the device, and ease of determination of whether the device has been triggered. The device may be used in very high numbers in large stores. Therefore the cost to manufacture becomes an important consideration. In order to keep costs low, the design of the device should be kept simple.

The device may be used on article constructed of materials that may easily tear or rip. The device should be as light as possible, while maintaining reliability, in order not to damage the article to be protected.

Previous attempts have been made to provide anti theft ink tags such as are described in U.S. Pat. Nos. Re. 35,361, 5,045,172 and 4,944,075 to Hogan et al. (the '361, '172 and '075 patents); U.S. Pat. Nos. 5,438,738, 5,392,620, 5,275,122 and 5,372,020 to Stolz et al. (the '738, '620, '122 and '020 patents); U.S. Pat. No. 5,347,262 to Thurmond et al. (the '262 patent); U.S. Pat. Nos. 5,031,287 and 5,022,244 to Charlot et al. (the '287 and '244 patents); U.S. Pat. No. 5,069,047 to Lynch et al. (the '047 patent), all of which are incorporated herein by reference.

The '738 patent describes an anti-theft ink tag. The tag is composed of a base element, and a locking element. The locking element is attached to the base element by a connecting unit. The connecting unit is composed of an elongated pin. The base element contains a marking substance container (ink ampule) held in place by a tongue. An attempt to improperly remove the tag causes the head of the elongated pin to push the tongue into the ink ampules and fracture them.

The '361 and '172 patents describe anti-theft ink tags. The tag is composed of a base component, and a locking component. The locking component is attached to the base component by a pin. The connecting pin has a pin head and a breaker element. The base component contains glass vials (ink ampules). An attempt to improperly remove the tag causes the pin head to push the breaker element into the ink ampules and fracture them.

The '075 patent describes an anti-theft ink tag. The tag is composed of a base component and a locking component. The locking component is attached to the base component by a pin. The connecting pin has a pin head and a breaking balls. The base component contains glass vials (ink ampules). An attempt to improperly remove the tag causes the pin head to push the breaking balls into the ink ampules and fracture them.

The '122 patent describes an anti-theft ink tag. The tag is composed of a base element, and a locking element. The locking element is attached to the base element by a pin. The head of the connecting pin has an abutment part. The base element contains ink ampules. An attempt to improperly remove the tag causes the pin head and abutment part to push into the ink ampules and fracture them.

None of the devices described above describe an anti theft ink tag which effectively deters the theft of articles by permanently staining them yet is reliable, lightweight, simple and inexpensive to manufacture, and provides its user an easy manner to determine if the device has been triggered.

Thus, there is a need in the art for a lightweight effective anti theft ink tag.

There is an additional need in the art for such a device to be inexpensive and easy to manufacture.

There is additional need in the art for such a device to provide its user an easy manner to determine if the device has been triggered.

SUMMARY OF THE INVENTION

The present invention solves significant problems in the art by providing a reliable, lightweight and simple anti theft ink tag that is inexpensive to manufacture that provides its user an easy manner to determine if the device has been triggered. Generally described, the present invention provides a housing composed of a base component and a cover component. The base component supports a plurality of ampules containing a permanent staining substance. The base component has a plurality of holes which allow the staining substance to escape if the ampules are fractured. The cover component is used to cover the base component. The cover component has a break away element which is permanently attached to an elongated pin type connecting unit. The elongated pin type connecting unit is used to attach the device to the article to be protected. If unauthorized removal of the device is attempted, the break away element fractures the ampules causing the staining substance to escape through the holes in the base component.

Accordingly, it is an object of the present invention to provide a reliable, lightweight, simple, and inexpensive anti theft ink tag.

It is an additional object of the present invention to provide an anti theft ink tag with a break away element of the cover that is permenantly attached to a pin type connecting unit.

It is an additional object of the present invention to provide an anti theft ink tag with a break away element of the cover that fractures ampules containing a permanent staining substance.

It is an additional object of the present invention to provide an anti theft ink tag that provides its user an easy manner to determine if the device has been triggered.

These and other objects, features, and advantages of the present invention may be more clearly understood and appreciated from a review of ensuing detailed description of the preferred and alternate embodiments and by reference to the accompanying drawings and claims.

DETAILED DESCRIPTION OF THE PREFERRED EMBODIMENT

Figure 1:
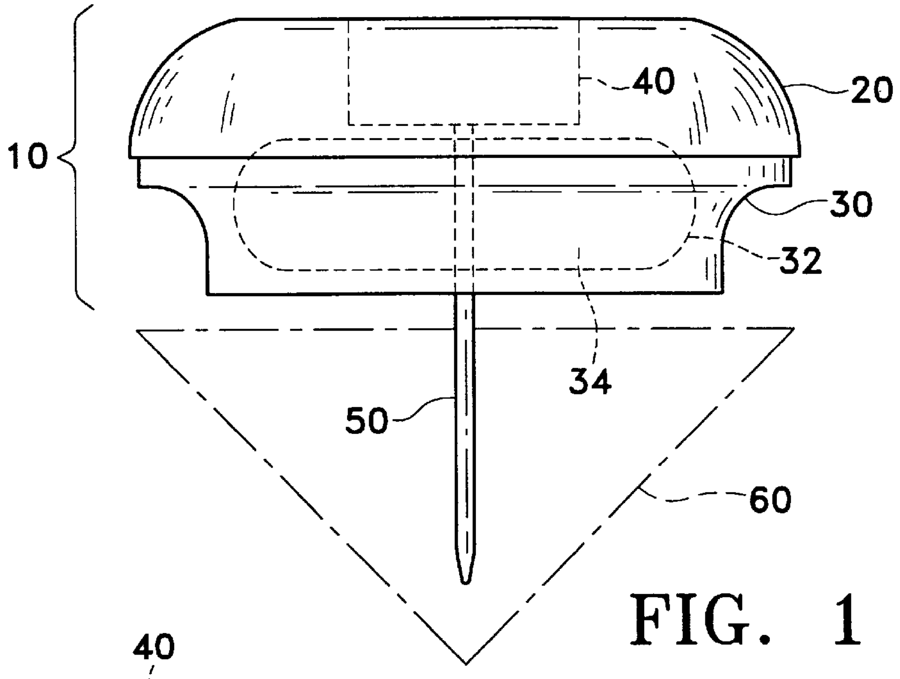
FIG. 1 is a plan view showing a side of an embodiment of the present invention.

Referring initially to FIG. 1 of the drawings, in which like numerals indicate like elements throughout the several views, in a preferred embodiment the housing of this invention is generally illustrated by reference numeral 10. The base component 30, supports two ampules 32, containing a permanent staining substance 34. The cover component 20, covers the base component 30, and has a break away element 40, above the ampules 32. The break away element is permanently attached to an elongated pin type connecting unit 50. The elongated pin type connecting unit 50, is placed through the article to be protected and locked into place by a locking unit 60.

Figure 2:
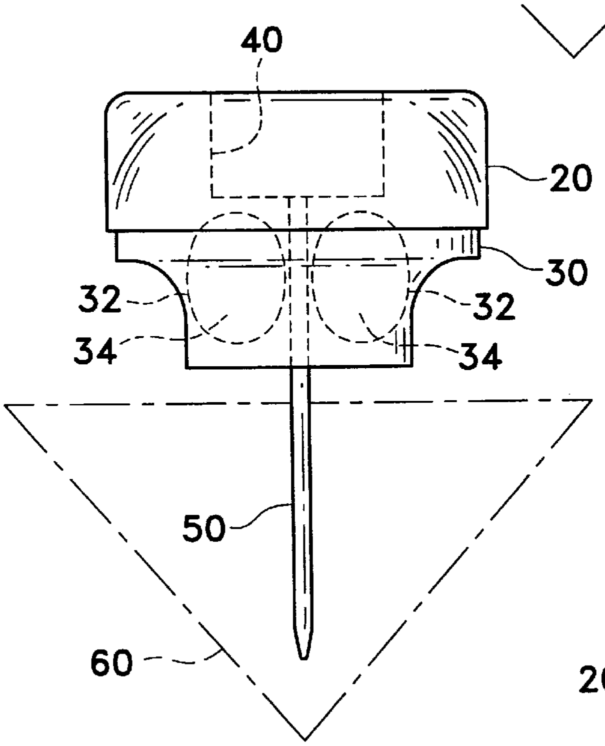
FIG. 2 is a plan view showing a front of an embodiment of the present invention.

FIG. 2 shows the break away element 40, above the ampules 32. The elongated pin type connecting unit 50, runs between the ampules 32, and is locked into a locking unit 60. The break away element 40, is in position to fracture the ampules 32, if a downward force is applied to the elongated pin type connecting unit 50 by attempting to remove the device without releasing the locking unit 60.

Figure 3:
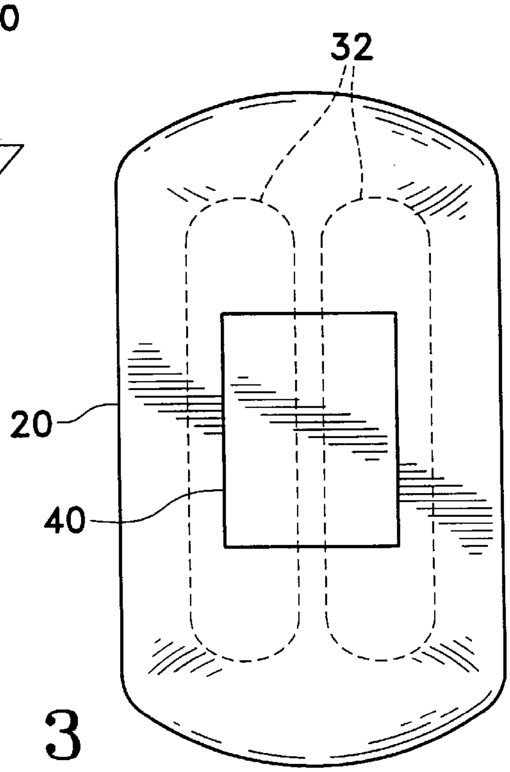
FIG. 3 is a top elevational view of an embodiment of the present invention.

FIG. 3 shows a top view of the cover component 20. The break away element 40, is shown in position above the ampules 32.

Figure 4:
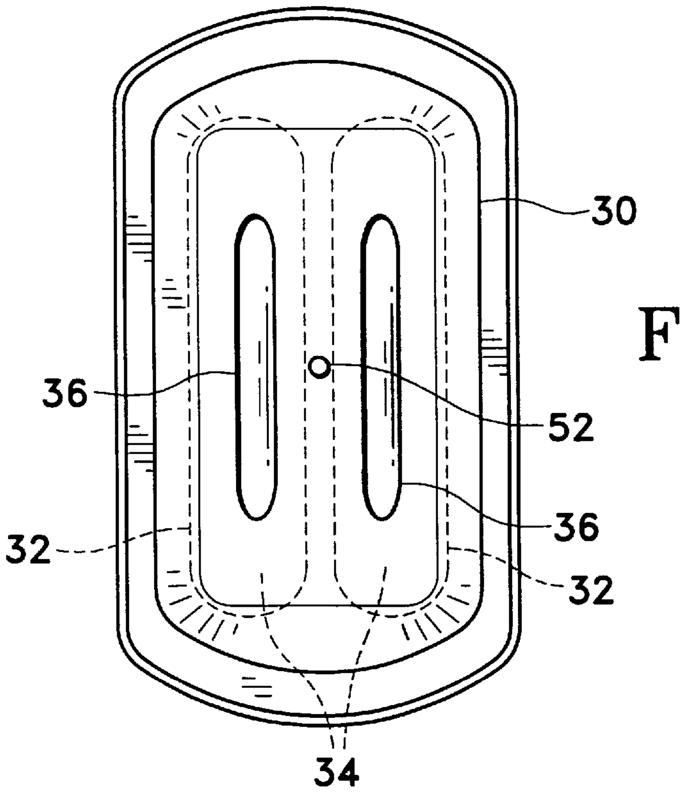
FIG. 4 is a bottom elevational view of an embodiment of the present invention.

FIG. 4 shows a bottom view of the base component 30. The ampules 32, are supported above holes 36, in the base component. The holes 36, allow the permanent staining substance 34, to escape if the ampules 32, are fractured. The base component 30, has a centrally located hole 52, that supports the elongated pin type connecting unit 50.

Figure 5:
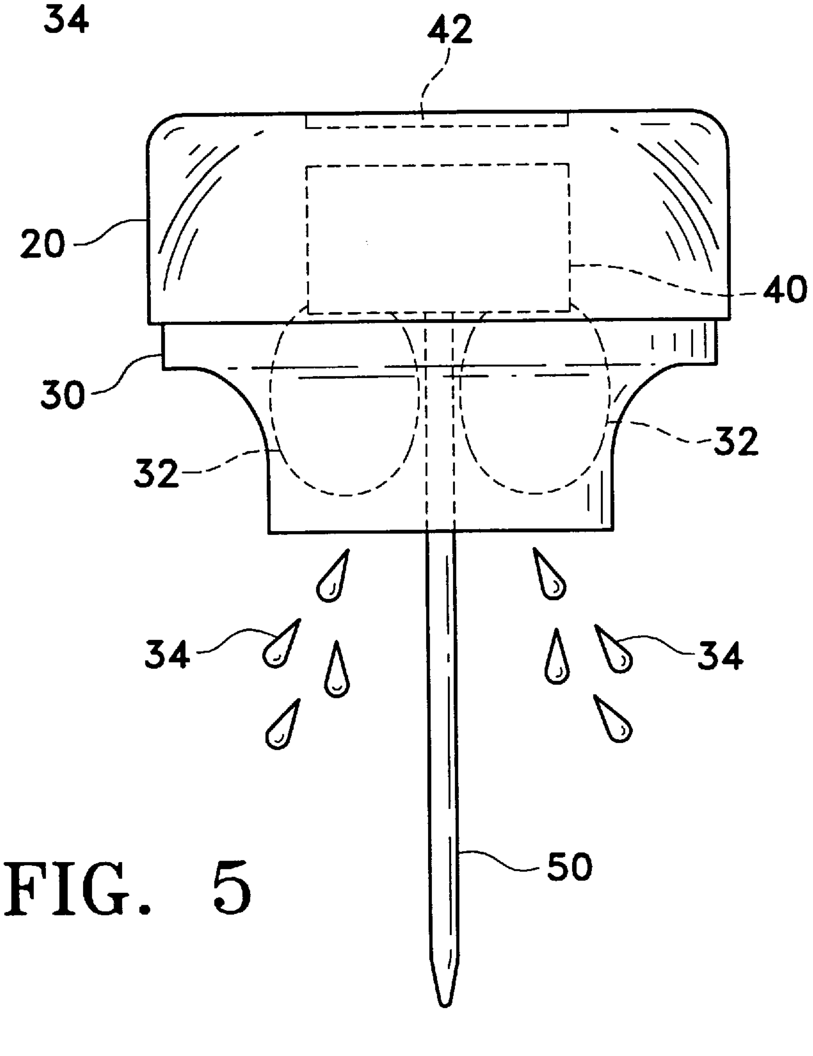
FIG. 5 is a view of an embodiment of the present invention being triggered.

FIG. 5 shows the device being triggered. Unauthorized removal causes a downward force on the elongated pin type connecting unit 50. This causes the break away element 40, to break away from the cover component 20, leaving a viewing hole 42 in the cover component 20. The break away element 40, is forced into the ampules 32, by the downward force exerted on the elongated pin type connecting unit 50. The break away element 40, fractures the ampules 32, allowing the permanent staining substance 34, to escape through the holes 36, in the base element thereby permanently staining the article. A portion of the permanent staining substance 34, escapes through the viewing hole 42, and stains the top of the cover component 20. The viewing hole 42, created as a result of the break away element 40, breaking away from the cover component 20, as well as stain left on the cover component 20, allows easy determination that the device has been triggered.

Having described the invention in detail, those skilled in the art will appreciate that modifications may be made of the invention without departing from its spirit. Therefore, it is not intended that the scope of the invention be limited to the specific embodiment illustrated and described. Rather it is intended that the scope of the invention be determined by the appended claims and their equivalents.

What is claimed is:

1. A device for deterring theft of articles, comprising:

a plurality of ampules;

a permanent staining substance to be contained in said ampules;

a housing which encloses said ampules, said housing comprising a base component supporting said ampules and a cover component to cover said base component, said cover component containing a break away element;

a means to allow said staining substance to escape if said ampules are fractured;

a means for attaching said device to the articles to be protected whereby unauthorized removal of said device causes said ampules to fracture; and a means for detecting the escape of said staining substance if said ampules are fractured.

2. The device of claim 1, wherein said base component has a plurality of holes which allow said staining substance to escape if said ampules are fractured.

3. The device of claim 2, wherein said means for attaching said device to the articles to be protected comprises an elongated pin type connecting unit.

4. The device of claim 3, wherein said base component has a centrally located hole which supports said elongated pin type connecting unit.

5. The device of claim 4, wherein said break away element of said cover component is permanently attached to said pin type connecting unit.

6. The device of claim 5, wherein said break away element causes said ampules to fracture if unauthorized removal of said device is attempted.

7. The device of claim 6, wherein said means for detecting the escape of said staining substance comprises the escape of said staining substance through a viewing hole in said cover component, said viewing hole resulting from the breaking away of said break away element from said cover component.

8. A device for deterring theft of articles, comprising:

a plurality of ampules;

a permanent staining substance to be contained in said ampules;

a housing which encloses said ampules;

a means for attaching said device to the articles to be protected whereby unauthorized removal of said device causes said ampules to fracture;

a base component supporting said ampules and having a plurality of holes which allow said staining substance to escape if said ampules are fractured;

a cover component to cover said base component;

an elongated pin type connecting unit;

a central hole in said base component which supports said elongated pin type connecting unit; and a break away element of said cover component into which said connecting unit is permanently attached and wherein said break away element causes said ampules to fracture if unauthorized removal of said device is attempted;

a means for detecting the escape of said staining substance if said ampules are fractured.

* * * * *